United States Patent
Arent et al.

(10) Patent No.: US 6,818,346 B2
(45) Date of Patent: Nov. 16, 2004

(54) STATIC COF DIFFERENTIAL POLY FILM REAM WRAP

(75) Inventors: Wendy L. Arent, Appleton, WI (US); Lou Ann Mueller, Little Chute, WI (US); Michael R. Nowak, Hilbert, WI (US)

(73) Assignee: Coating Excellence International, Wrightstown, WI (US)

( * ) Notice: Subject to any disclaimer, the term of this patent is extended or adjusted under 35 U.S.C. 154(b) by 0 days.

(21) Appl. No.: 10/430,108

(22) Filed: May 5, 2003

(65) Prior Publication Data

US 2004/0126606 A1 Jul. 1, 2004

Related U.S. Application Data

(63) Continuation-in-part of application No. 10/331,298, filed on Dec. 30, 2002.

(51) Int. Cl.[7] .......................... B32B 31/22; B32B 27/32; B32B 27/36

(52) U.S. Cl. .................... 429/195.1; 428/516; 428/212; 428/480; 428/483; 427/359; 427/369; 156/308.2

(58) Field of Search ............................. 428/195.1, 516, 428/212, 480, 483; 427/359, 369; 156/308.2

(56) References Cited

U.S. PATENT DOCUMENTS

| | | | |
|---|---|---|---|
| 4,389,450 A | | 6/1983 | Schaefer et al. |
| 4,961,992 A | * | 10/1990 | Balloni et al. .............. 428/332 |
| 5,503,436 A | | 4/1996 | Alpaugh et al. |
| 5,673,309 A | | 9/1997 | Woynoski et al. |
| 6,150,035 A | * | 11/2000 | DeFife et al. .............. 428/500 |
| 6,287,700 B1 | * | 9/2001 | Kong et al. ................. 428/447 |
| 6,370,240 B1 | | 4/2002 | Woynoski et al. |

* cited by examiner

*Primary Examiner*—D. Lawrence Tarazano
(74) *Attorney, Agent, or Firm*—Philip M. Weiss; Weiss & Weiss

(57) ABSTRACT

A solid plastic film wrapper with a Static Coefficient of Friction (Static COF) differential used for packaging paper products, and a method for producing the same.

7 Claims, 2 Drawing Sheets

STATIC COF DIFFERENTIAL POLY FILM REAM WRAP

RELATED APPLICATIONS

The present application is a continuation-in-part of application Ser. No. 10/331,298 filed Dec. 30, 2002.

FIELD OF THE INVENTION

The present invention relates to a solid plastic film wrapper with a Static Coefficient of Friction (Static COF) differential used for packaging paper products, and a method for producing the same.

BACKGROUND OF THE INVENTION

Reams (i.e., 500 sheets) of cut paper (8½×11, etc.) for copy machines, computers, printers, and other applications are most commonly packaged for shipping, storage, and retail sale in ream wrappers made of various wrap materials. These wrap materials traditionally have been paper (poly coated or two papers laminated with poly), plastic film, or a paper/solid plastic film combination. In addition to encasing reams of paper, the wrap materials protect the wrapped paper product from physical damage and moisture pickup during shipping and storage. The wrap materials also protect the wrapped product from physical damage during repeated handling and stocking on retail shelves.

As small offices and home offices have proliferated, the distribution of reams of paper has changed from boxes for large users to wrapped reams for retail stores and the small office and home office segments. Retail and in-store distribution of reams of paper has placed increasing demands on the wrapper due to rougher handling and more frequent re-stocking of the individual reams. Increased handling of the reams has resulted in more reams breaking open, damaging the wrapped paper product by allowing it to pick up moisture, tear, or get minor curl—physical damage that ultimately results in jams in the end-user's printer or copy machine. As a result, the market has demanded a stronger ream wrap.

At the same time, the market has demanded that manufacturers develop wrap materials with improved printing surfaces to enhance graphics and provide an eye-appealing wrapped product for the home office and small office consumer. One such material is a solid plastic film ream wrap that provides a smooth, high gloss surface for printing. Film ream wraps may also be transparent so that the paper product encased in the wrapper is visible from the outside of the package.

Traditionally, film ream wraps have consisted of one heavy weight film layer or two separate layers of solid, lighter weight plastic films laminated together with an adhesive. A primary disadvantage of current film ream wraps is the difficulty of handling slippery film materials on the manufacturers' packaging lines. Film wrappers tend to be slippery, causing the paper product to slip off-center while being wrapped on the packaging line. Manufacturers often must make costly modifications to traditional packaging lines in order to accommodate film ream wraps. Furthermore, film wrappers, which lack the structural strength and support of heavier weight paper laminates, coated papers, and paper/film wrappers, are more vulnerable to physical damage during shipping, handling, and storage. Another disadvantage of current film ream wraps is that, once the consumer opens the side seal of the wrapped package to remove sheets of paper, the wrapper can readily tear, exposing any paper remaining in the wrapper to physical damage, tearing, and moisture.

Thus, the market is demanding a stronger film ream wrap that provides an enhanced printing surface, greater structural support for the wrapper product, and less vulnerability to tearing and physical damage. The market also is demanding a film ream wrap that is easier to handle on traditional packaging lines, that facilitates the wrapping process by minimizing or preventing slippage of the paper product, and that obviates the need for costly modifications to traditional packaging operations. The present invention provides these added benefits.

U.S. Pat. Nos. 5,673,309 and 6,370,240 relate to a method of dispensing telephone cards from automatic teller machines and card constructions used therewith. Telephone time is appointed to a number of sheetlets printed with random numbers which serve as a personal identification number. They are packaged in bricks and activated when installed in an ATM or when dispensed.

Sheetlets, which are dispensed from the ATM machine, are currency sized and provide coefficient of friction on each surface thereof, and the coefficient friction differential enables dispensing of individual sheetlets of the group by caliper or opacity. Sheetlets have a lay flat quality. To assure proper single sheet dispensing, a telephone card sheetlet, must have the quality of being able to lay flat and having frictional characteristics to enable one sheetlet to be slid over another. The surfaces of the sheetlet should have a static coefficient of friction, namely the ratio of the force required to start moving a 193.3 gram sled across a surface divided by the weight of the sled, of about 0.55, preferably from about 0.45 to about 0.7. The coefficient of friction differential between one surface of the sheetlet to the other should be at least 25%, and within the range specified above. The coefficient of friction differential can be realized by coating the front and back surface of the sheetlet with a material which will, by its nature, inherently provide the coefficient of friction differential necessary to enable the sheetlets to be individually dispensed. Alternatively, the sheetlets can be supplied as a laminate of two different materials of different coefficients of friction to enable the sheetlets to be individually dispensed. One surface, may, for instance, be paper, and the other a polymer coating or self supporting polymer film such as polyester. This may be achieved by applying a polymeric coat from a solvent, emulsion, or as a hot melt to the surface of the paper.

U.S. Pat. No. 5,503,436 relates to an ATM dispensible self adhesive postage stamp construction. The postage stamp construction is formed of a plurality of postage stamps adhered to a currency sized release liner by an ooze resistant pressure sensitive adhesive which construction is coated with a polymeric coating on the face of the stamp and the under surface of the release liner and dispensible from an automatic teller machine.

The stamps comprise paper facestock and other paper weight of about 56 grams per meter squared having upper and lower surface. The upper surface is surfaced with stamped graphics and coated having a surface coefficient of friction greater than 0.45. The relevant frictional characteristics between slip over surfaces undercoating further prevent the dispensing of multiple stamp sheetlets.

Requirement for the overcoat and the undersurface whether coated or not is that the surface have a static coefficient of friction, namely, the ratio of the force required to start moving a 193.3 gram sled divided by the weight of the sled across about 0.45, preferably between 0.45 to about 0.7. This corresponds to 135 grams to a static face to imitate sled movement of about 87 grams to about 135 grams. It has been found that provided the friction requirements are met there should be at least a 25% difference between the coefficient of friction for the upper surface and the under-surface. This may be achieved by selection of paper or coatings as well as providing an irregular surface as by embossing or including in a coating filler or the like. The difference of the coefficient of friction will greatly aid in ensuring single sheetlet dispersing.

Friction is determined by securing a sheetlet to a flat surface placing a 193.3 gram sled measuring 6"×20.25" on the sheetlet and pulling the sled with a force gauge to initiate movement of the sled over the sheetlet. The force measured is the force required to initiate movement of the sled over the sheetlet at a rate of 0.5 inch per minute.

For proper dispensing as measured by the static coefficient of friction of 0.45 to about 0.7, the coefficient of friction difference ensures preventing multiple dispensing of sheetlets from an automatic teller machine with coefficient of friction differential between the preferred upper and lower surfaces by about 25% or more.

U.S. Pat. No. 4,389,450 relates to a multiple layer packaging film in which the outer polymeric layers cooperate to achieve, between themselves, a relatively constant coefficient of friction differential, a thin seal capability, and a lap seal capability, even after the film is stored in round up rolled form.

In the making of multiple layer flexible plastic-type films, after the film is produced, it is wound up in roll form for storage or shipment. It is normal to use, as one of the outer layers of the film, a tacky heat sealable material, such as ethylene vinyl acetate. The other outer layer of the film, on its surface, may be a non-sealant layer composed of a non-tacky type polymer.

If the tacky material is used as the entire composition of the one outer layer, the tackiness may function as an adhesive in the roll, such that the tacky sealant layer sticks to the non-sealant layer.

To avoid the above problem of the tacky sealant layer sticking to the non-sealant layer, it has been normal practice to incorporate a slip additive into the tacky layer to reduce its tackiness. It is known that the slip additive gradually migrates to the outer surface of the tacky layer. When the film has been in roll form and is subsequently unrolled, testing reveals that the coefficient of friction (COF) of the sealant layer has increased since the roll was made, and the COF of the non-sealant layer has decreased.

These films are commonly used with packaging machinery which is sensitive to the COF of both surfaces of the packaging material. Desirably, the COF of the non-sealant layer is about 0.4 to 0.5, and the COF of the sealant layer is 0.2 to 0.3.

The invention provides a multiple layer, heat sealable, flexible packaging material, having a slip additive in the heat seal layer which material can be stored in roll form, and in which the coefficients of friction of the two surfaces of the film are substantially constant with time.

This invention is exemplified by a multiple layer heat sealable packaging sheet structure having, one of its surfaces, a sealant layer, and on the other surface, a non-sealant layer. The sealant and non-sealant layers are heat sealable each to themselves and to each other. The non-sealant has a coefficient of friction between about 0.4 and 2. The sealant layer has a coefficient of friction of less than about 0.3. Importantly, the coefficient of friction of both the sealant and non-sealant layers is substantially constant for a period of at least 30 days when the sheet structure is stored in the form of a continuous web wrapped about a central core, with the sealant and non-sealant layers in surface-to-surface contact.

In a preferred structure, the non-sealant layer is a blend which can best be comprehended as substantially a base polymer and a blended-in tacky additive. About 25% by weight to about 75% of the blend is the base polymeric material which, in unblended composition, has a coefficient of friction of less than about 2. About 75% by weight to about 25% of the blend is the additive polymeric material which, in unblended composition, has a coefficient of friction greater than 2.

The base polymeric material can be an ethylene copolymer such as ethylene vinyl alcohol. Other suitable polymers include polyester, polypropylene and nylon. The additive polymer is usually an ethylene copolymer and can consist of ethylene acrylic acid, ethylene methyl acrylate, ethylene ethyl acrylate, ethylene vinyl acetate and ionomer. It is important that the coefficient of friction of the normally tacky material used in the outside sealant layer be reduced, so that there is no tacky surface on the film which would stick to the packaging equipment. This is accomplished with slip additives which are known to reduce COF in this type of application.

The coefficient of friction used, is that obtained by ASTM D-1894, in which two surfaces of the one material are in friction surface-to-surface contact.

Polymer compositions having COF below 0.4 cannot be engaged by the packaging equipment without excessive slippage or excessive equipment wear. Polymer compositions having COF greater than about 2.0 have a tendency to stick to the equipment.

The entire film may be coextruded. Portions may be adhesive laminated, or extrusion laminated. In some cases, it is desirable that certain layers and particularly the non-sealant layer be oriented, either run axially, or biaxially. In a typical coextrusion process, the sealant layer composition is supplied to a first extruder. The non-sealant layer composition is supplied to a second extruder. The two compositions are extruded through the extruders and fed to a die where they are formed in a single, multiple layer film.

SUMMARY OF THE INVENTION

The present invention relates to a solid plastic film wrapper that is used for packaging paper products. The product is made by laminating two sheets of solid plastic film together using either poly or any known adhesive. It is an object of the present invention for the product to be produced by laminating two sheets of solid plastic film, using poly or any known adhesive, with each sheet of film having a different Static Coefficient of Friction (Static COF) measurement. Static COF is measured in accordance with the TAPPI standard T 815 om-95 suggested test method.

It is also an object of the present invention for the product to be produced by laminating two sheets of solid plastic film with the same Static COF, with one of the sheets of film being coated by any known method of application with a material that alters the Static COF on the coated sheet of film. A result of treating one sheet of film is to create a COF differential between the two films, making the film with higher Static COF slightly tackier to minimize or prevent slippage on paper packaging lines.

The present invention relates to a solid plastic film ream wrapper comprising: two sheets of solid plastic film laminated together using either poly or any known adhesive. The two sheets of solid plastic film have either different Static COF or the same Static COF measurements. When two sheets of film having the same Static COF are used, then one side of the laminated product is coated by any known means with a material that alters the Static COF, such as varnish, making the Static COF higher or lower than that of the opposite side of the laminated product. This creates a product whereby two separate sheets of solid plastic film, laminated together using poly or any known adhesive, have a Static COF differential. An object of the present invention is to create a Static COF differential between opposite sides of the film wrapper to minimize or eliminate slippage during the paper packaging process.

The present invention also relates to a method for producing a solid plastic film ream wrapper comprising: laminating together two separate sheets of solid plastic film with differing Static COF measurements using poly or any known adhesive. The result is a solid plastic film ream wrapper with a Static COF differential on opposite sides of the film wrapper, making the wrap material less prone to slippage on paper packaging lines.

The present invention also relates to a method for producing a solid plastic film ream wrapper comprising: laminating together two separate sheets of solid plastic film with the same Static COF measurements and then coating, or applying by any known method, one side of the laminated product with a material that alters the Static COF measurement of the film on one side. The resulting product has a Static COF differential on opposite sides of the film wrapper, making the wrap material less prone to slippage on paper packaging lines.

The present invention also relates to a method for producing a solid plastic film ream wrapper using two sheets of film with the same Static COF comprising: coating, or applying by any known method, a material that alters the Static COF on one sheet of solid plastic film and then laminating, using poly or any known adhesive, the coated sheet to an uncoated sheet of the same film. The resulting product is a laminated film ream wrapper with a Static COF differential, with the side of the film that was not coated to alter Static COF being laminated to the uncoated sheet of film. The resulting product has a Static COF differential on opposite sides of the film wrapper, making the wrap material less prone to slippage on paper packaging lines.

The present invention relates to a solid plastic film ream wrapper comprising: a first layer of polypropylene, biaxially oriented polypropylene (BOPP), or polyester solid film. A second layer comprises polypropylene, BOPP, or polyester solid film having a different Static COF measurement than the first layer. A third layer comprises poly or any known adhesive, the third layer being interposed between the first and second layers. It is an object of the present invention for the first and second layers to have a thickness gauge of between about 40 to 400. It is also an object of the present invention for the first and second layers of film to have a Static COF differential of at least 0.02.

The present invention relates to a solid plastic film ream wrapper comprising: a first layer of polypropylene, BOPP, or polyester solid film. A second layer comprises polypropylene, BOPP, or polyester solid film with the same Static COF measurement as the first layer. The second layer also comprises a polypropylene, BOPP, or polyester solid film that is coated or treated on one side, by any known method of application, with a material that alters the Static COF, creating a Static COF differential from the first layer of at least 0.02. A third layer comprises poly or any known adhesive, the third layer being interposed between the first and second layers with the side of the film coated to alter Static COF facing the outside of the laminated product. It is an object of the present invention for the first and second layers to have a thickness gauge of between about 40 to 400. It is also an object of the present invention for the Static COF differential between the first uncoated layer and the opposite coated layer of film to be at least 0.02.

The present invention relates to a method of making a solid plastic film ream wrapper comprising: the first and second film layers having a Static COF differential of at least 0.02 are conveyed by any known means toward a pair of nip rollers. The film layers are directed into an adjacent, non-contact position with the poly or adhesive layer on its respective opposite sides prior to passing through the nip rollers. The layers pass through the nip rollers, forming the laminated solid plastic film ream wrapper.

The present invention also relates to a method of making a solid plastic film ream wrapper comprising: applying to, or coating by any known method one side of either of the solid plastic film layers (having the same Static COF) with any material that alters the Static COF of the coated layer, creating a Static COF differential between the film layers of at least 0.02. The solid plastic film layers are conveyed by any known means toward a pair of nip rollers. The film layers are directed into an adjacent, noncontact position with the poly or adhesive layer on its respective opposite sides prior to passing through the nip rollers. The layers pass through the nip rollers, forming the laminated solid plastic film ream wrapper.

The present invention also relates to a method of making a solid plastic film ream wrapper comprising: the first and second film layers having the same Static COF measurement are conveyed by any known means toward a pair of nip rollers. The film layers are directed into an adjacent, non-contact position with the poly or adhesive layer on its respective opposite sides prior to passing through the nip rollers. The layers pass through the nip rollers, forming the laminated solid plastic film ream wrapper. The laminated product is then coated on one side by any known means of application with any material that alters the Static COF of the coated side, creating a Static COF differential of at least 0.02 between the opposite sides of the laminated product.

The solid plastic film ream wrapper with a Static COF differential of at least 0.02 on opposite sides of the product may be used with the higher Static COF on the outside or the inside of the final wrapped paper product.

It is an object of the present invention for the product to be made by laminating two sheets of solid plastic film, using poly or any known adhesive, with each sheet of film having the same Static Coefficient of Friction (Static COF) measurement. One side of the laminated product is printed or reverse printed and then, through any known means, coated with a varnish or other known material that alters the Static COF measurement of the coated side. The varnish or other coating is applied (over the printing) through any known means in a recurring pattern or design, such as a logo or other marking, rather than flood-coated over the entire surface of the film. The resulting laminated product has a differing Static COF measurement on the coated and printed side which is derived from the varnish or other coating applied in a recurring pattern or design across the surface of the film. The printing and coating processes may be made in one pass or two passes through the appropriate printing and coating equipment.

It is an object of the present invention for the product to be made by printing or reverse-printing one side of film and then, through any well known means, coating or applying over the printed side a varnish or other material that alters the Static COF measurement of the coated side. The varnish or other coating is applied through any well known means in a recurring pattern or design, such as a logo or other marking, rather than flood-coated over the entire surface of the film. The resulting product is a reverse-printed film with a differing Static COF measurement on the coated and printed side which is derived from the varnish or other coating applied in a recurring pattern or design across the surface of the film. The printing and coating processes may be made in one pass or two passes through the appropriate printing and coating equipment.

The present invention also relates to a method for producing a solid plastic film ream wrapper comprising: laminating together two separate sheets of solid plastic film with the same Static COF measurement using poly or any known adhesive. The laminated product is then printed or reverse printed and subsequently coated or covered with a varnish or other material in a recurring pattern, design, logo, or other marking across the printed surface (rather than flood-coated across the entire surface). This varnish or other coating comprises a material that alters the Static COF measurement of the coated side of the lamination, making the wrap material less prone to slippage on paper packaging lines and easier to open on the sealed and folded ends of the wrapped product.

The present invention relates to a method for producing a solid plastic film ream wrapper comprising: one sheet of solid plastic film that is printed or reverse-printed and subsequently coated or covered with a varnish or other material in a recurring pattern, design, logo, or other marking across the printed surface (rather than flood-coated over the entire surface). This varnish or other coating comprises a material that alters the Static COF measurement of the coated side of the film, making the wrap material less prone to slippage on paper packaging lines and easier to open on the sealed and folded ends of the wrapped product.

The present invention relates to a solid plastic film ream wrapper comprising: a first layer of polypropylene, biaxially oriented polypropylene (BOPP), or polyester solid film. A second layer comprises polypropylene, BOPP, or polyester solid film having the same Static COF measurement as the first layer. A third layer comprises poly or any known adhesive, the third layer being interposed between the first and second layers. It is an object of the present invention for the first and second layers to have thickness gauge of between about 40 to 400, preferably approximately 120 per layer. It is also an object of the present invention for one layer of the laminated product to be printed or reverse-printed and then coated with a varnish or other material in a recurring pattern, design, logo, or other marking, resulting in a static COF differential of at least 0.02 on the coated side.

The present invention relates to a solid plastic film ream wrapper comprising: a sheet of polypropylene, biaxially oriented polypropylene (BOPP), or polyester solid film that has a thickness gauge of between about 40 and 400, preferably, approximately 240. The sheet of film is either printed or reverse-printed and then coated with a varnish or other material in a recurring pattern, design, logo, or other marking, which alters the static COF differential by at least 0.02 on the coated side of film.

DETAILED DESCRIPTION OF THE INVENTION

Figure 1:
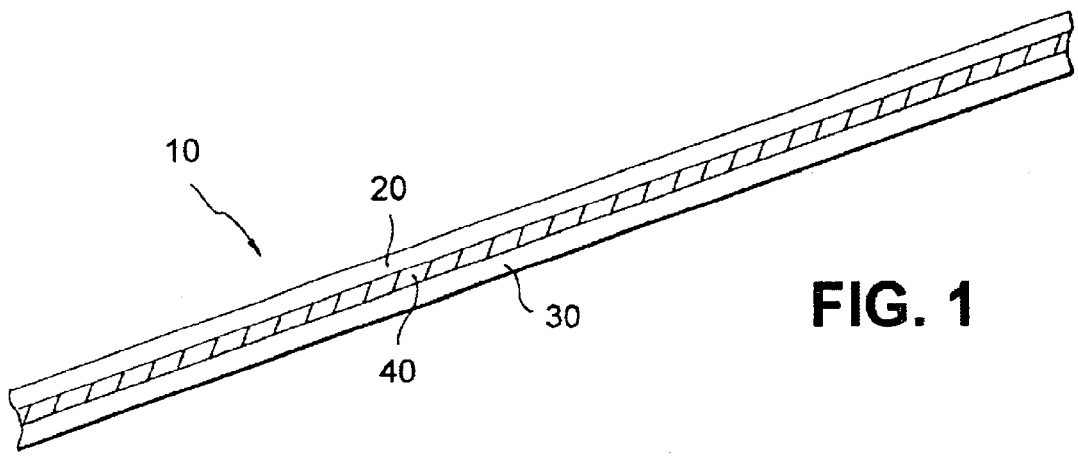
FIG. 1 is a cross-sectional view of one embodiment of the solid plastic film ream wrapper with Static COF differential according to the present invention.

FIG. 1 shows an embodiment of the solid plastic film ream wrapper with Static COF differential. The solid plastic film ream wrap material 10 is made of a first layer 20 comprising a polypropylene, biaxially oriented polypropylene (BOPP), or polyester solid film. A second layer 30 also comprises a polypropylene, BOPP, or polyester solid film with a Static COF differential of at least 0.02 compared to that of the first layer 20. A third layer 40 comprises poly, polymer resin, copolymer or terpolymer resins alone or blended with polyester, or any known adhesive, interposed according to the invention between the first layer 20 and the second layer 30.

The first layer 20 and second layer 30 of the solid plastic film ream wrap material 10, as depicted in FIG. 1, can be made of either polypropylene, biaxially oriented polypropylene (BOPP), or polyester solid film of a thickness gauge between about 40 to 400.

The third layer 40 of the solid plastic film ream wrap material 10 can be made of poly, polymer resin, copolymer and/or terpolymer resins produced by combining butene, hexene, and/or octene with ethylene feedstock, alone, or in combination with polyester, or any known adhesive.

Figure 2:
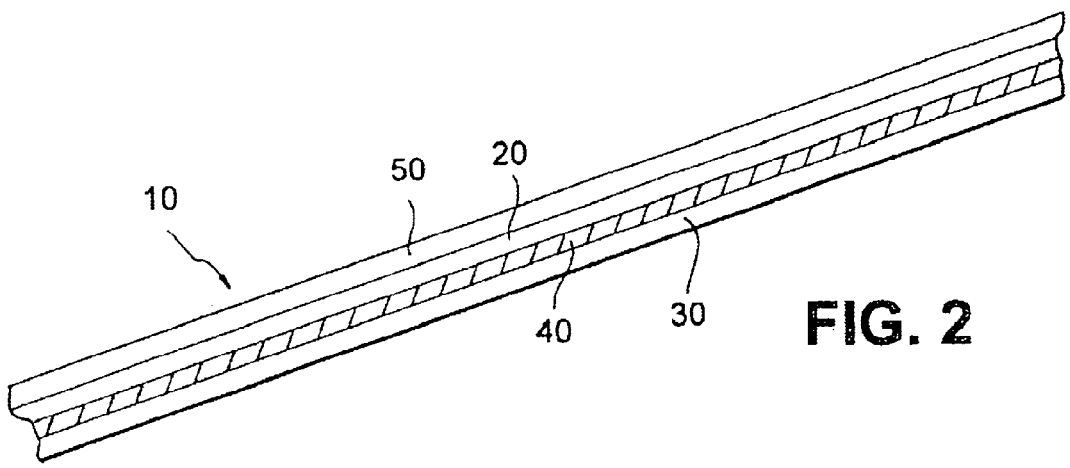
FIG. 2 is a cross-sectional view of another embodiment of the solid plastic film ream wrapper with Static COF differential according to the present invention.
Figure 2A:
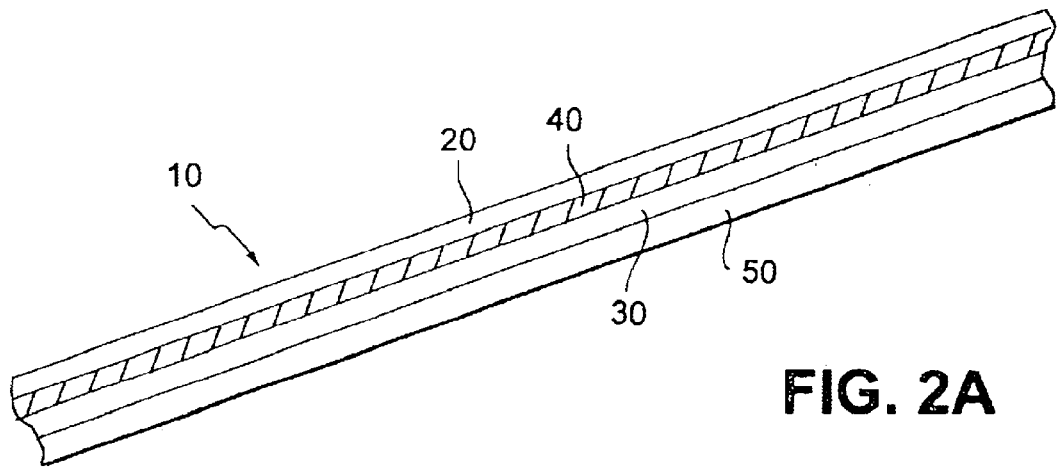
FIG. 2A is a cross-sectional view of another embodiment of the solid plastic film ream wrapper with Static COF differential according to the present invention.

In a second embodiment of the solid plastic film ream wrap material 10, as depicted in FIGS. 2 and 2A, the first layer 20 comprises a polypropylene, BOPP, or polyester solid film. A second layer 30 also comprises a polypropylene, BOPP, or polyester solid film with a Static COF measurement that is the same as that of the first layer 20. A third layer 40 comprises poly, polymer resin, copolymer and/or terpolymer resins alone or blended with polyester, or any known adhesive, interposed according to the invention between the first layer 20 and the second layer 30. A fourth layer 50 comprises any known material or coating, for example, a varnish, that alters Static COF and that is applied by any known means to either the first layer 20 (FIG. 2) or the second layer 30 (FIG. 2A).

Figure 3:
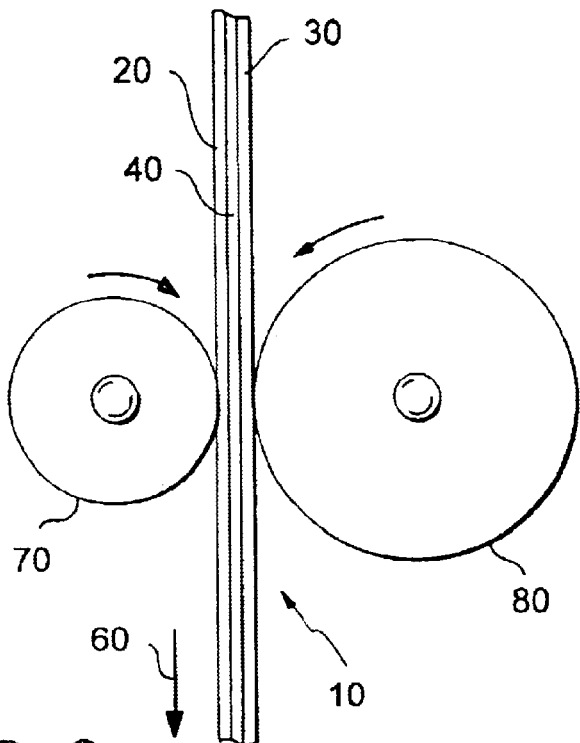
FIG. 3 is a schematic view of the method and apparatus for producing the solid plastic film ream wrapper with Static COF differential according to the present invention.

In a further embodiment, the lamination process for making the film ream wrap material with Static COF differential 10 is schematically shown in FIG. 3. The layer 40 comprising poly, polymer resin, copolymer or terpolymer resins alone or blended with polyester, or any known adhesive, is applied to either side of the plastic film layers 20 or 30 having a Static COF differential of at least 0.02, and is conveyed toward a pair of nip rollers 70 or 80 by and known method. The film layers 20 and 30 are directed by any well known means into an adjacent, noncontact position with the poly, polymer resin, copolymer and/or terpolymer resins alone or blended with polyester, or any known adhesive on their respective opposite sides prior to passing through the nip rollers 70 and 80. The nip rollers 70 and 80 rotate in opposite directions. As the layers 20, 30, and 40 pass through the nip rollers 70, 80 in the direction of the arrow 60, the three layers contact for the first time as they pass through the nip rollers 70, 80 to form a three layered material.

Figure 4:
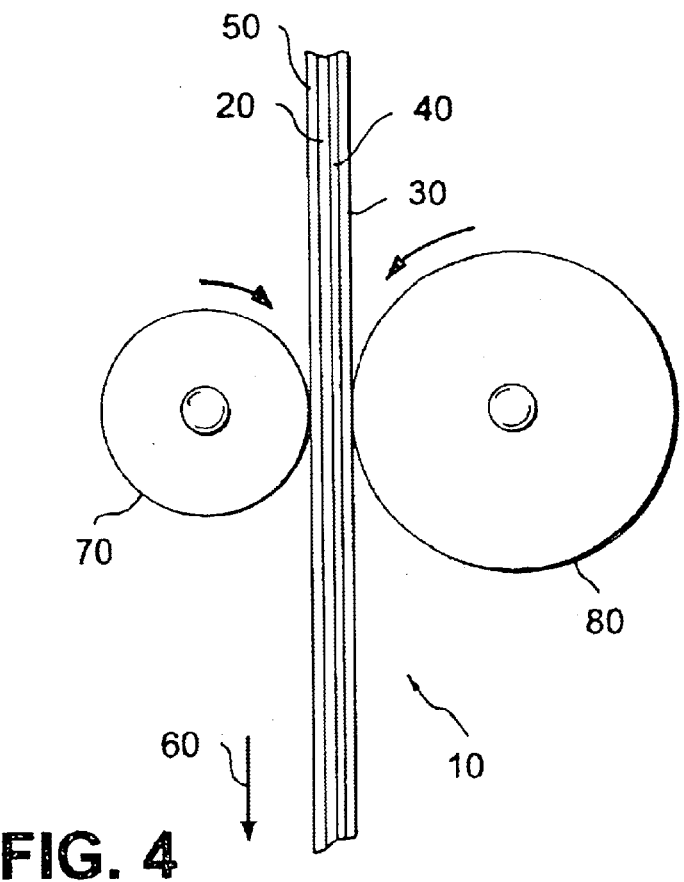
FIG. 4 is a schematic view of another method and apparatus for producing the solid plastic film ream wrapper with Static COF differential according to the present invention.

In a further embodiment, the lamination process for making the film ream wrap material with Static COF differential 10 is schematically shown in FIG. 4. The layer 50 comprising any material that alters the static COF measurement of either plastic film layer 20 or 30 is applied by any known means and method to either side of one of the plastic film layers 20 or 30. The layer 40 comprising poly, polymer resins, copolymer or terpolymer resins alone or blended with polyester, or any known adhesive, is applied to either side of the plastic film layers 20 or 30 that have not been coated to alter Static COF, and is conveyed toward a pair of nip rollers 70 or 80 by any known method. The film layers 20 and 30, one of which has been coated with the material altering Static COF (layer 50), are directed by any well known means into an adjacent, noncontact position with the poly, polymer resin, copolymer and/or terpolymer resins alone or blended with polyester, or any known adhesive on their respective opposite sides prior to passing through the nip rollers 70 and 80. The nip rollers 70 and 80 rotate in opposite directions. As the layers 20, 30, 40 and 50 pass through the nip rollers 70, 80, in the direction of the arrow 60, the four layers contact for the first time as they pass through the nip rollers 70, 80 to form a four layered material.

What is claimed is:

1. A solid film ream wrapper comprising:
   a first layer of polypropylene, biaxially oriented polypropylene (BOPP), or polyester solid film;
   a second layer of polypropylene, biaxially oriented polypropylene (BOPP), or polyester solid film;
   said first layer and said second layer having same Static Coefficient of Friction (COF) measurement; and
   a third layer of polymer, copolymer and/or terpolymer resins, alone, or blended with polyester, or any known adhesive, said third layer interposed between said first layer and said second layer;
   said first layer or said second layer being coated in a recurring pattern, design, logo, or other marking on one side with any material that alters said Static COF measurement by at least 0.02.

2. A solid film ream wrapper consisting of:
   a sheet of polypropylene, biaxially oriented polypropylene (BOPP), or polyester solid film having a thickness gauge between about 40 to 400.

3. The solid film ream wrapper of claim 2 wherein said thickness gauge is about 240.

4. The solid film ream wrapper of claim 2 wherein either side of film is coated in a recurring pattern, design, logo, or other marking with any material that alters Static COF measurement by at least 0.02.

5. A method for making a solid plastic film ream wrapper comprising:
   coating or applying in a recurrent pattern, design, logo, or other marking one side of a solid plastic film layer with any material that alters Static COF of said coated layer;
   conveying said coated film layer and a second plastic film layer to a pair of nip rollers;
   said first layer and said second layer having same static coefficient of friction;
   creating a static COF differential between said film layers of at least 0.02;
   directing said first and second layers into an adjacent non contact position with a polymer or adhesive layer on its respective opposite side prior to passing through said nip rollers;
   passing said layers through said nip rollers.

6. A method for making a solid plastic film ream wrapper comprising:
   conveying a first layer comprising a polypropylene, biaxially oriented polypropylene (BOPP), or polyester solid film; and a second layer comprising polypropylene, biaxially oriented polypropylene (BOPP), or polyester solid film toward a pair of nip rollers; said first and second layers having same static coefficient of friction;
   directing said first and second layers into an adjacent non contact position with a polymer or adhesive layer on its respective opposite side prior to passing through said nip rollers;
   passing said layers through said nip rollers;
   forming said laminated solid plastic film ream wrapper;
   coating or applying in a recurrent pattern, design, logo, or other marking one side of a plastic film layer with any material that alters the Static COF of said coated layer.

7. A method of making a solid plastic film ream wrapper comprising:
   coating or applying in a recurrent pattern, design, logo, or other marking one side of a plastic film layer with any material that alters the Static COF of said coated layer by at least 0.02;
   conveying said coated film layer and a second plastic film layer to a pair of nip rollers;
   said first layer and said second layer having same static coefficient of friction;
   creating a static COF differential between said film layers of at least 0.02;
   directing said first and second layers into an adjacent non contact position with a polymer or adhesive layer on its respective opposite side prior to passing through said nip rollers;
   passing said layers through said nip rollers.

* * * * *